Jan. 20, 1925. 1,523,531
E. BUGATTI
ANTIFRICTION BEARING
Filed Oct. 9, 1924
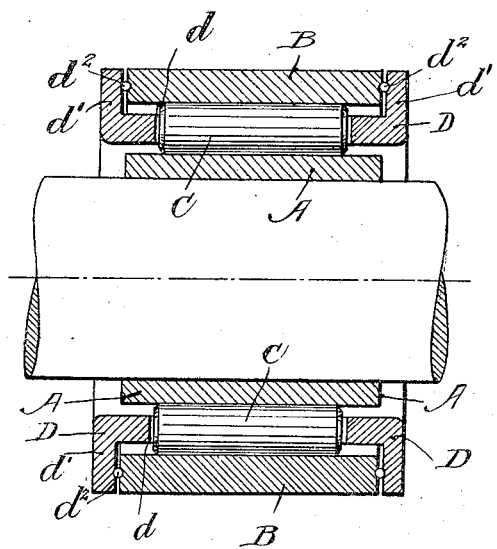
Inventor
Ettore Bugatti,
By Henry Orr
Atty Patented Jan. 20, 1925.

1,523,531

UNITED STATES PATENT OFFICE.

ETTORE BUGATTI, OF MOLSHEIM, FRANCE.

ANTIFRICTION BEARING.

Application filed October 9, 1924. Serial No. 742,671.

*To all whom it may concern:*

Be it known that I, ETTORE BUGATTI, a subject of the King of Italy, and a resident of Molsheim, Bas-Rhin Department, France, have invented certain new and useful Improvements in Antifriction Bearings; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

The ball or roller bearings in use at the present time are in most cases provided with cages whereby the prejudicial friction between the balls or rollers is obviated.

But such arrangement offers a drawback due to the eccentric position assumed by the said cage by reason of its own weight, the inner and outer surfaces of the cage entering into contact upon a large surface with the inner and outer races. Due to the difference in the velocities of the inner periphery of the cage and of the outer periphery of the inner race, friction is produced between their contact surfaces; this has but little effect at slow speeds, but becomes an important factor at high speeds, since the cage is caused to bear by centrifugal force against the races according as the speed of rotation increases.

In order to obviate this inconvenience, I interpose balls between the cage and the ends of the outer race by which the said cage is centered and is prevented from entering into contact with either of the said races.

The drawing is a vertical section of an anti-friction bearing embodying my invention.

Said bearing comprises an inner race member A surrounded by an outer race member B and anti-friction rollers C interposed between said members, said rollers being maintained in spaced relation by a cage D.

The cage D consists of an annular member provided with a plurality of transverse slots $d$ adapted to receive the rollers C and maintain the latter in spaced relation. The ends of the cage project beyond the ends of the inner and outer race members and have lateral flanges $d'$ $d'$ which project, as shown in the drawing, flush or substantially flush with the outer periphery of the outer race member B.

The inner face of each flange $d'$ and the two ends of the outer race member B are formed with co-operating race-ways for the reception of a plurality of small balls $d^2$. These balls operate to maintain the cage concentric to both race members, so that the cage will be prevented from dragging or engaging the opposing peripheries of the race members and at the same time prevent relative lateral movement between the cage and outer race member.

What I claim is:

An anti-friction bearing comprising an inner race member, an outer race member, a roller cage and rollers therein interposed between the race members, said cage having lateral flanges, the ends of said outer race members and the inner faces of the lateral flanges having co-operating ball races, and balls inserted in the latter whereby said cage is prevented from dragging on either race member.

In testimony that I claim the foregoing as my invention, I have signed my name hereto.

ETTORE BUGATTI.